Oct. 24, 1967   J. B. KENNEDY ETAL   3,349,401
DIGITAL BEARING MEASURING SYSTEM
Filed Aug. 25, 1966   8 Sheets-Sheet 1

INVENTORS.
JOHN B. KENNEDY
RALPH L. ASHER

ATTORNEY

Fig. 9

INVENTORS.
JOHN B. KENNEDY
RALPH L. ASHER

ATTORNEY

Oct. 24, 1967

J. B. KENNEDY ET AL

3,349,401

DIGITAL BEARING MEASURING SYSTEM

Filed Aug. 25, 1966

COMPOSITE
PULSE TRAIN
WITH 15 CPS
COMPONENT    A

PULSE TRAIN
WITH 15 CPS
COMPONENT
REMOVED      B

HARMONIC
TRACKING
GATES        C

GATED
PULSES       D

TRAPEZOID
THRESHOLD    E

COUNTER
NAGATIVE
PHASE
CONTROL      F

COUNTER
POSITIVE
PHASE
CONTROL      G

*Fig. 11*

INVENTORS.
JOHN B. KENNEDY
RALPH L. ASHER

ATTORNEY

United States Patent Office 3,349,401
Patented Oct. 24, 1967

3,349,401
DIGITAL BEARING MEASURING SYSTEM
John B. Kennedy, Montville, and Ralph L. Asher, Hackensack, N.J., assignors to International Telephone and Telegraph Corporation, Nutley, N.J., a corporation of Maryland
Filed Aug. 25, 1966, Ser. No. 575,012
11 Claims. (Cl. 343—106)

This invention relates to aerial navigation bearing systems and more particularly to a digital bearing measuring system.

In certain aerial navigation systems such as Tacan, described in volume 33, March 1956, of "Electrical Communication," the technical journal of the International Telephone and Telegraph Corporation and associated companies, azimuthal information is given by the relative phase between reference signals and a multi-lobed rotating antenna pattern which phase varies at different azimuthal positions with respect to the beacon. The beacon transmits several different types of pulse signals which the airborne radio set translates into bearing and distance information. The transmitting antenna system in the beacon produces multi-lobed directional patterns rotating at about 15 cycles per second. To a receiver receiving the pulse signals from the transmitter, the rotation of the antenna pattern produces an amplitude modulation envelope on these pulses. When the major lobe of the directional pattern points in a given direction, such as north, a special signal in the form of a short burst of pulses is transmitted from the beacon which signal is referred to as the "north reference signal." By comparing the phase of the modulation envelope, due to rotation of the beacon pattern with that of the north signal, an indication of the bearing of the receiver with respect to the beacon is obtained. If only the north signal and a single-lobed directional pattern were employed, only a relatively coarse indication of bearing would be obtainable. To obtain a finer indication, the directional pattern is multi-lobed with each lobe separated for example by 40° from the next, and with auxiliary reference pulse signals in the form of short bursts of pulses being emitted each time one of these lobes passes the predetermined reference points (for example, the north) as the antenna pattern is rotated. The rotation of this pattern produces a modulation envelope of 135 cycles per second (9 lobes multiplied by 15 cycles per second) on top of the fundamental of 15 cycles per second due to the main directive lobe. By comparing the phase of the auxiliary pulse signal with respect to that of the 135 cycle per second modulation envelope a fine azimuthal indication is obtained.

The standard art prior Tacan system makes use of primarily analog techniques to measure bearing, and detection of the received modulation envelope is accomplished using circuitry for peak riding and audio filtering. These circuits have in the past been major sources of bearing error. Furthermore, the use of analog techniques subject the equipment to noise and jamming which are usually random in nature.

An earlier Tacan system described in the copending U.S. patent application of John B. Kennedy, Ser. No. 524,106, filed: Feb. 1, 1966, entitled: Digital Tacan Bearing Measuring System discloses a digital bearing measuring system in which the entire video signal is used to servo a counter to track the modulation signals, thus, obviating use of the receiver in multiplex fashion for other purposes. The system earlier disclosed also requires that any pulses which disturb the random distribution of signal must be eliminated before processing. In that system if the signal does not exhibit a mathematically random behavior, bearing errors could occur.

Accordingly, it is an object of this invention to provide an improved bearing measuring system using primarily digital techniques.

Another object of this invention is to provide a low duty bearing measuring system.

The above-mentioned and other features and objects of this invention will become more apparent by reference to the following description taken in conjunction with the accompanying drawings, in which.

General description

Figure 1:
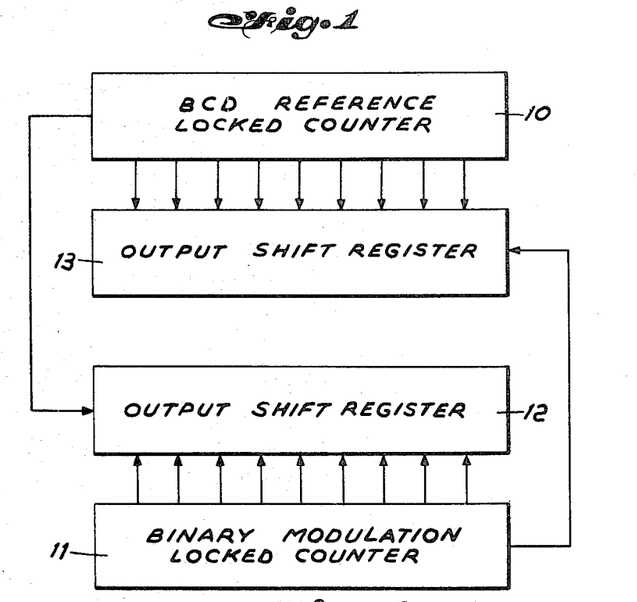
FIGURE 1 is a simplified block diagram illustrating a portion of a digital bearing receiver.
Figure 2:
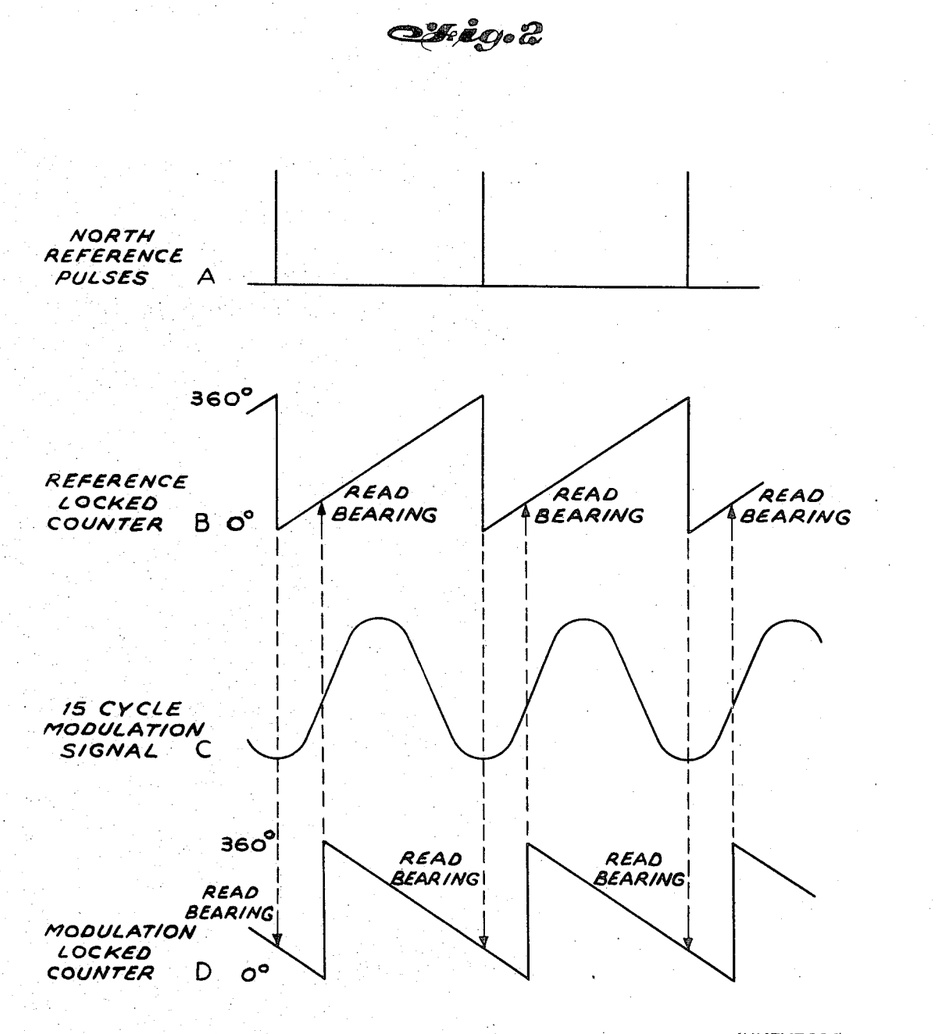
FIGURE 2 is a series of waveforms illustrating the principles of operation of the digital bearing receiver of FIGURE 1.

FIGURES 1 and 2 illustrate a digital bearing measuring system and operation thereof respectively. A binary coded decimal (BCD) counter 10 (the phase-locked reference counter) is phase-locked to the north reference signal, waveform A in FIGURE 2, and counts upward through a 360° cycle at a 15 cycle per second rate. Counter 10 is adjusted in phase so that it passes through 0° at the arrival of the north reference group, as illustrated in waveform B of FIGURE 2. Although only phase-locking to the north reference group is shown, this counter is also phase-locked to the auxiliary reference groups, as shown hereinafter. This latter step enhances accuracy and signal-to-noise ratio characteristics.

A second counter 11 (the phase-locked modulation counter) is phase-locked to the modulation envelope, waveform C of FIGURE 2, and counts down through a 360° cycle at a 15 cycle per second rate. Counter 11 is adjusted in phase so that it passes through 0° at the 135 cycle, 0° cross-over closest to the 15 cycle, 0° cross-over. The quantity held in counter 11 is illustrated in waveform D of FIGURE 2. Although only the 15 cycle signal is shown, the counter is also more accurately phase-locked to the 135 cycle fine information.

It can be seen from FIGURE 2 that the quantity held in reference counter 10 when modulation counter 11 is zero is the measured bearing. Also, the quantity held in modulation counter 11 when reference counter 10 is zero is the measured bearing. If reference counter 10 is constructed in a BCD (binary coded decimal) format and modulation counter 11 is constructed with a binary format, opportunity for reading in either BCD or binary exists. Therefore, no additional decoding circuitry is required to provide BCD for digital panel indicator or binary for a computer input. When reference counter 10 reaches zero, the data in modulation counter 11 can be transferred into a binary output shift register 12 (FIGURE 1); likewise when modulation counter 11 reaches zero, the data in reference counter 10 can be transferred into a BCD output shift register 13.

Phase-locking the reference counter

Figure 3:
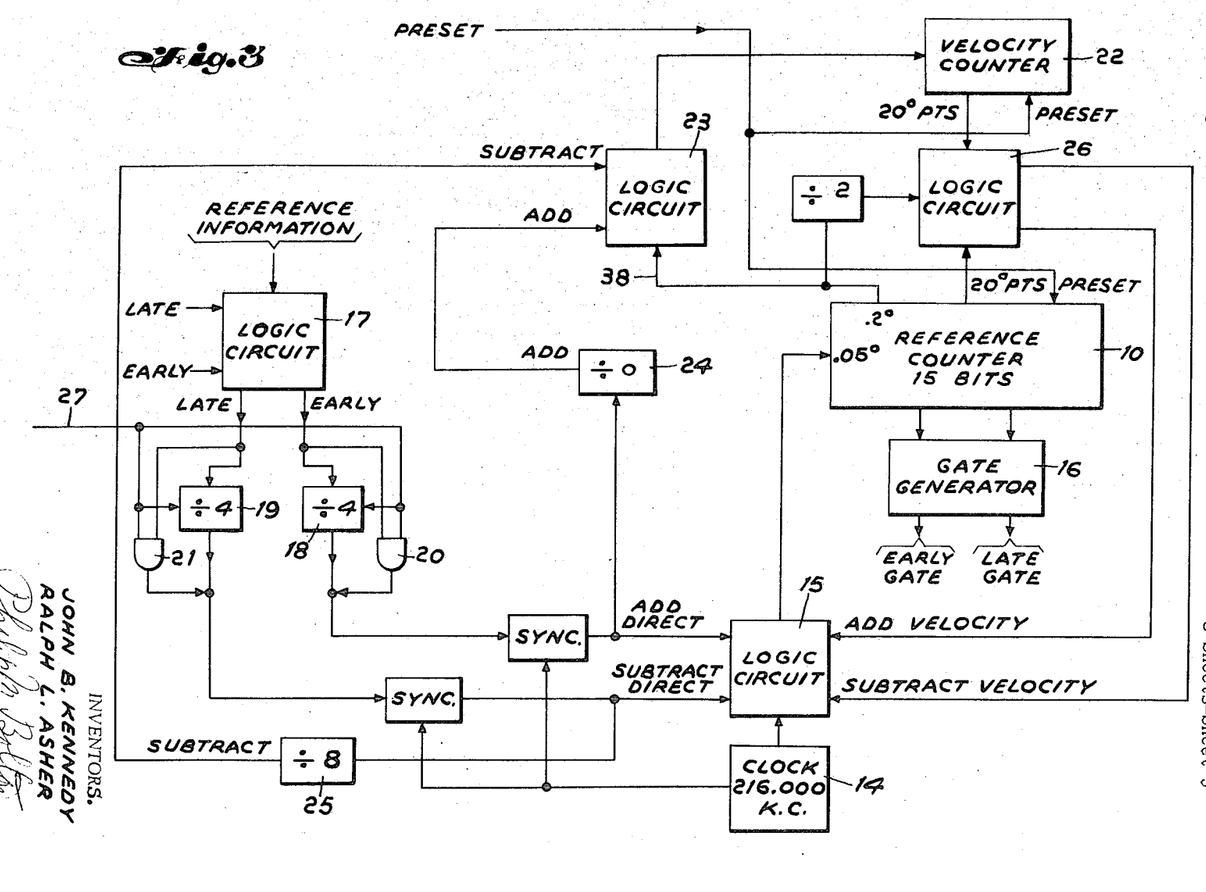
FIGURE 3 is a block diagram illustrating a circuit for phaselocking the reference counter of FIGURE 1.

The circuit for phase-locking of reference counter 10 to the reference groups is shown in FIGURE 3. BCD counter 10 is adjusted with a least significant bit of 0.025 degree, and a cycle length of 360°. An input clock generator 14 causes circulation through an entire cycle of counter 10 at a rate of 15 cycles per second.

Initially, counter 10 is preset to zero on the arrival of a north reference group for accelerated acquisition (note: the system will perform properly without initial preset but a significantly longer period of time is required to accomplish phase-locking). The preset signal is derived by recognition of the peculiar pulse spacings of the north reference bursts by a decoder circuit (not shown). Since counter 10 is preset to zero, when a north group is received, it can be expected that the next north reference group should be received when the counter again reads zero. Further, the auxiliary reference groups should be received when the counter reads 40°, 80°, 120°, 160°, 200°, 240°, 280°, and 320°. Phase tracking is accomplished by opening two gates during the anticipated reference group arrival time, and making minor adjustments to the counter phase to insure that the reference group remains centered in these gates.

The circuit employed for phase-locking of reference counter 10 comprises clock 14 the output thereof being coupled to BCD counter 10 via a logic circuit 15 (details of which will be described hereinafter).

Figure 4:
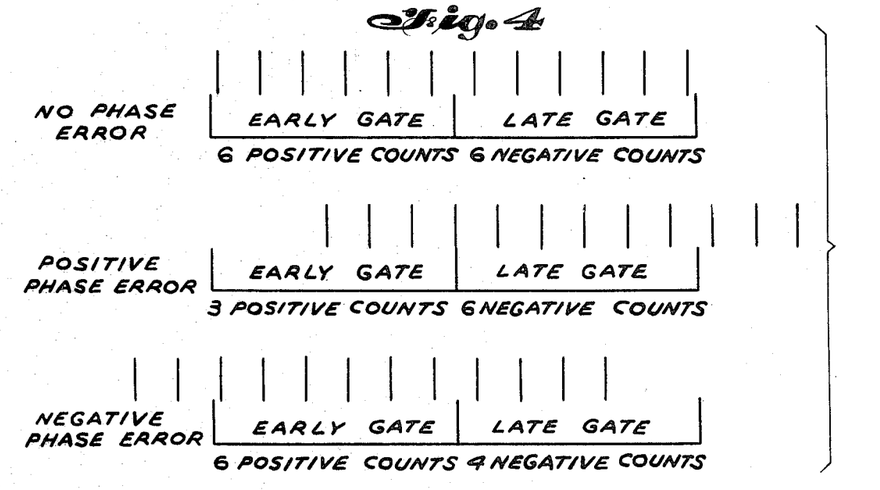
FIGURE 4 is a series of diagrams illustrating the principles of adjusting the reference counter phase to coincide with the reception of the reference groups.

At each 40° point on the cycle of counter 10, two gates are produced by a gate generator 16. These are the gates indicated in FIGURE 4 as the early gate and the late gate. The Tacan information signal with the modulation information removed is applied at a logic circuit 17 (to be described hereinafter) and the reference burst pulses contained in this information is applied in the early and late gates. The pulses falling into the first or early gate are added to the pulses from clock generator 14 at a logic circuit 15 (described hereinafter) and fed to BCD counter 10, causing the counter phase to advance. The pulses falling in the second or late gate are deleted from the pulses from clock generator 14 at logic circuit 15 causing the counter phase to retard. If counter 10 is exactly on time when the reference groups arrive an equal number of pulses fall within the early and late gates, and thus, an equal number of pulses are added to and subtracted from the input pulses to BCD counter 10 causing zero net phase shift. If the reference group is somewhat shifted in time with respect to the counter reference, more counts are either added or subtracted from the counter thus altering its phase. These situations are diagramed in FIGURE 4.

Divide by four counters 18 and 19 are employed after signal acquisition and initial phase-locking has occurred to provide smoothing. During the time when a signal is being acquired and BCD counter 10 is being phase-locked to it, dividers 18 and 19 are by passed via a pair of coincident gates 20 and 21. This occurs when a Mode signal is incoming on line 27.

BCD reference counter 10 is also adjusted to compensate for deviations in beacon antennas speed from the mean 15 cycles per second. A velocity counter 22 is preset by the same signal that preset reference counter 10. Counter 22 counts upwards at a 135 cycle per second rate. It obtains its clock from a selected bit line on BCD counter 10 via a logic circuit 23 (described hereinafter).

The pulses falling in the aforementioned reference gates are acted upon by divide by 8 circuits 24 and 25 and also affect a change on velocity counter 22 via logic circuit 23.

The time of arrival of velocity counter 22 at 20° and the time at which the 20° bit of the main BCD counter 10 reaches 20 degrees are compared in time at a logic circuit 26 (described hereinafter). This time represents the antenna speed deviation from exactly 15 cycles. If velocity counter 22 reaches 20° after the 20 degree point at counter 10 pulses appear on a subtract velocity line at logic 15 to the inputs of counter 10 causing pulses to be deleted. If the opposite occurs, the pulses will appear on an add velocity line at logic circuit 15 to the input to the main counter 10, causing pulses to be added to counter 10.

In this manner BCD reference counter 10 is phase-locked to the reference groups with antenna speed variations compensated for.

Figure 5:
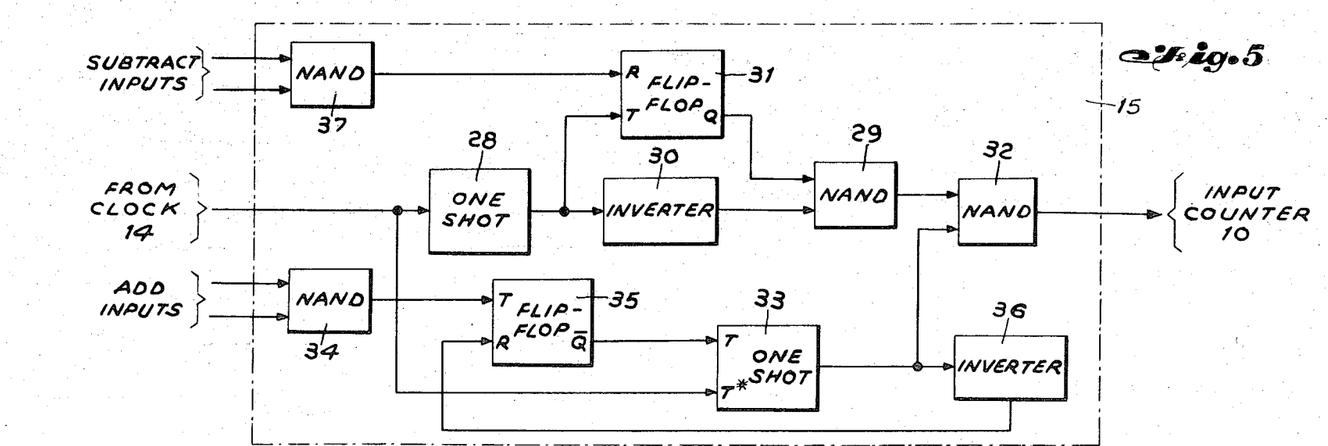
FIGURES 5, 6, 7 and 8 are a series of block diagrams illustrating the logic circuits of FIGURE 3.

The following paragraphs describe in detail the hereinbefore mentioned reference logic circuits 15, 17, 23 and 26:

Referring to FIGURE 5, with no add or substract pulses at the indicated inputs, clock generator 14 drives counter 10 at a rate of 15 cycles per second by feeding pulses to the input thereof at a 216 kilocycle rate. The output pulses from clock 14 trigger a one shot 28 with the output therefrom applied to a NAND gate 29 via an inverter 30. NAND gate 29 is enabled by an output from the Q line of a flip flop 31. The output from NAND gate 29 is applied to the input of counter 10 via a NAND gate 32.

The function of this logic circuit is to provide the subtraction of clock pulses from the input to counter 10 when signals are incoming on the subtract lines or the addition of added pulses when signals are incoming on the add lines. Looking at the add line first, normally one shot 28 is triggered on the leading edge of the clock. It is desired then to add in pulses at the other phase of the clock, the trailing edge. Every clock pulse tries to trigger one shot 33 on the trailing edge of the clock; but, one shot 33 can only be triggered on the negative edge by being triggered on the T* line. The add inputs through a NAND gate 34 trigger a flip flop 35 so that when flip flop 35 has been trigger the $\bar{Q}$ line of that flip flop is low. This places a zero input on flip flop 33, and only when the T input of flip flop 33 is low can the negative edge of a clock pulse coming from clock 14 trigger one shot 33 on the T* line. When an add pulse comes in flip flop 35 it at a one, and the $\bar{Q}$ line is zero, and one shot 33 can be triggered on the negative edge of a clock pulse. Outputs from one shot 33 are mixed with the normal flow to add to the basic inputs to the main counter 10. They also go through inverter 36 to turn around and reset flip flop 35.

Normally a clock pulse triggers one shot 28 and goes through inverter 30 to NAND gate 29 and NAND gate 32. When it goes through NAND gate 29, there is assumed that there is a one at the second input of the NAND gate supplied by flip flop 31; this is normally the case. However, when pulses are supplied on either of the subtract lines they go through the NAND gate 37 and reset flip flop 31. When flip flop 31 is reset the Q line is at zero and the next normal clock coming to one shot 28 and inverter 30 cannot be passed through NAND gate 29. However, after the subtraction has taken place flip flop 31 is reset, put back into the one state, so that all the leading clock pulses are passed through this logic unimpeded, unless another pulse occurs on the subtract line. The output from one shot 28 is also applied to trigger flip flop 31 and the direction of triggering is to trigger it into the one state.

Logic 23 (see FIG. 6) operates in a similar manner to that of logic 15. Normally clock pulses for velocity counter 22, which are supplied from counter 10, enter on line 38 where they trigger a one shot 39. The output from one shot 39 goes to an inverter 40, NAND gate 41, and NAND gate 42, the output therefrom providing the normal output from the logic 23 circuit, which serves as the clock input to velocity counter 22.

Figure 6:
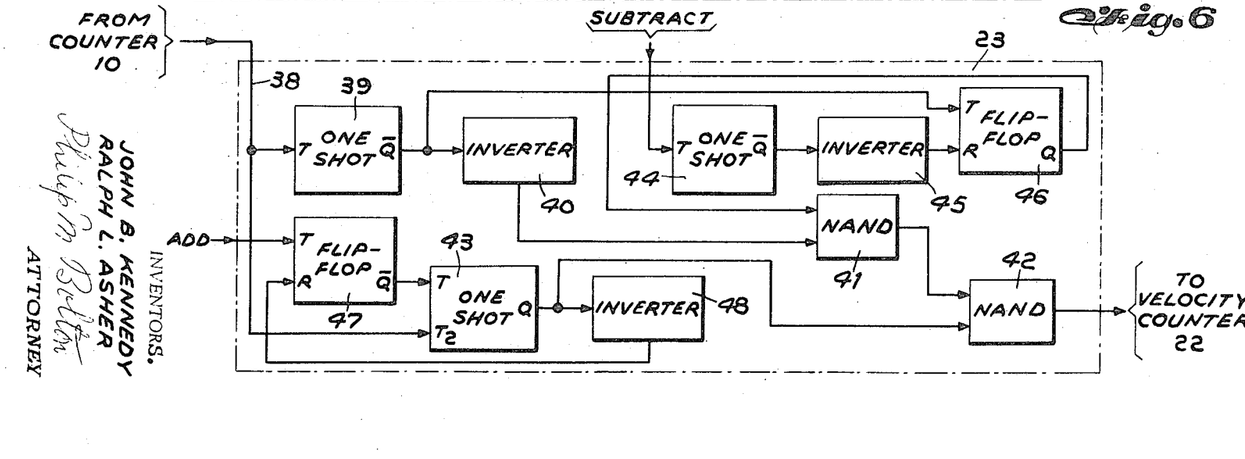

When there are add pulses incident at logic 23, for causing addition to the clock, which pulses are applied at the add line, a flip flop 47 is triggered to the zero state. This permits a one shot 43 to be triggered on the trailing edge of the clock pulses incoming on line 38 and provides a pulse which passes through a NAND gate 42 to velocity counter 22. This pulse also resets flip flop 47 via inverter 48. Therefore, a pulse has been added to the basic clock through NAND gate 42.

When a pulse is applied on the subtract line a one shot 44 is triggered. The main purpose of one shot 44 is to convert the pulses into a square wave. The output pulses from one shot 44 go through an inverter 45 and reset a flip flop 46. When the flip flop is reset, the Q line is in the zero state, therefore, inhibiting the normal flow of clock pulses to NAND gate 41. After the normal pulse has been applied and deleted from one shot 29 this same output is applied to the trigger line of flip flop 46 resetting it back to the one condition, therefore permitting the normal flow of the clock through inverter 40, NAND gate 41, NAND gate 42 and out.

Figures 7, 8, 12:
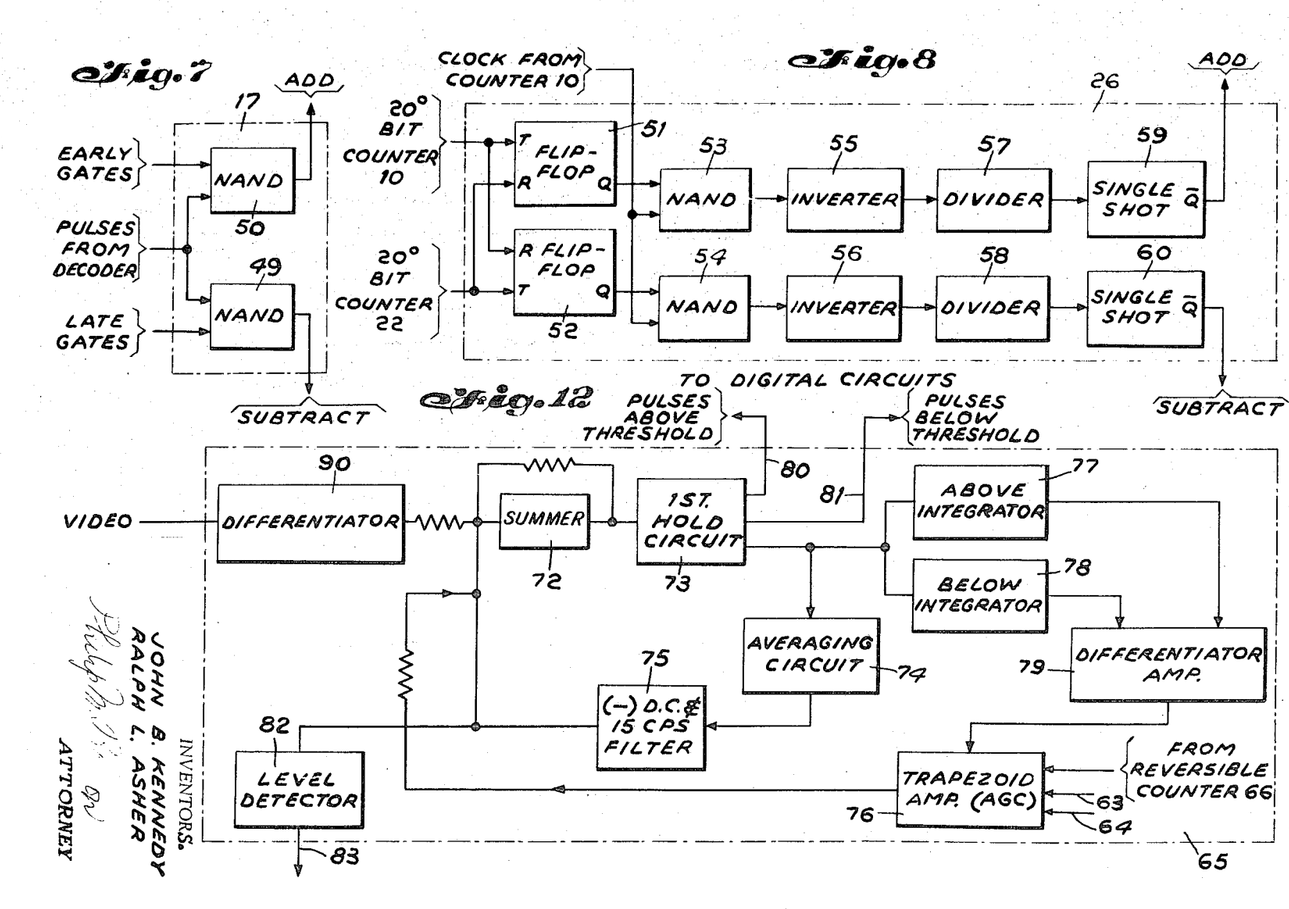
FIGURE 12 is a block diagram of the analog threshold circuit used in FIG. 9.

Logic circuit 17 compares the input signal information with the counter generated gates. The Tacan information (modulation removed) is applied to NAND gates along with the early gates and the late gates. The input to logic circuit 17 consists of pulses from the decoder, and early gates and late gates produced by reference gate generator 16. The early gates and the pulses from the decoder are gated to NAND gate 50. The output from NAND gate 50 causes addition to both direct inputs and velocity inputs of the reference tracking system. The late gates and pulses from the decoder are gated together in NAND gate 49. The output from NAND gate 49 causes subtraction to the velocity counter and the main counter clock.

The purpose of the logic shown in block 26 is to accomplish a phase comparison between velocity counter 22 and BCD counter 10 to produce a gate based upon this phase comparison which is proportional to the amount of velocity or antenna speed error. This gate is then used to gate pulses during an error gate, and divide them down to an amount suitable for introduction for controlling the phase of main counter 10.

The inputs to logic 26 consist of the phase of the main counter 10 represented by the 20° bit which cycles at 135 cycles, another input from the phase of the velocity counter represented by its most significant bit which also cycles at 135 cycles and a clock from the main counter 10. Two flip flops 51 and 52 are employed for comparing the phase relationship between the 20° bits. If the phase of 10 leads the phase of 22 then flip flop 51 is triggered on the leading edge of the pulse from counter 10 and produces a gate whose width is the leading edge of 10 to the leading edge of 22 at which time it resets. If the phase of 22 leads the phase of 10 then when the leading edge of 22 occurs flip flop 52 triggers and produces a gate lasting until the leading edge of 10 occurs. The output of the error-gate produced by either flip flop 50 or 51 is used to gate pulses in the main counter. Should the phase be produced by flip flop 52, a NAND gate 53 is enabled during the time in which 52 is in the one state. Flip flop 51 is returned to the one state, and then clock pulses are gated by NAND gate 54 which is finally triggered into the one state. The output pulses pass through inverters 55, and 56 divided down in dividers 57 and 58, and trigger one shots 59 and 60.

*Phase-locking the modulation counter*

To recover the modulation envelope, a binary counter is phased and frequency locked to the received envelope in a manner similar to that employed for reference group recovery (see the section on phase-locking the reference counter). The Tacan beacon signal consists of a train of essentially random pulses modulated by an AM envelope. Consider first the Tacan decoded video signal with reference groups eliminated and a 135 c.p.s. modulation component, but no 15 c.p.s. modulation. This signal is shown as waveform A in FIGURE 10.

If this signal is fed to a level detector, then the detector will give an output pulse whenever an input pulse exceeds the triggering threshold. By controlling the quiescent bias on the level detector input, the threshold can be adjusted at any level such as the zero degree and 180 degree points. One threshold of such a detector is represented as waveform B of FIGURE 10. It should be recognized that should the triggering DC component of threshold drift the detector output will remain symmetrical about the peak of the modulation envelope. It is this symmetry about the peak that is constantly mainained which provides for highly accurate bearing measurements.

The system described herein is designed to produce no net error in the presence of misinformation or noise information. It is a nulling type of system which when in balance all differences go to zero. It is one in which the distribution of pulses does not necessarily have to be completely random, thus reducing the effects of reference bursts and bunching in the Tacan signal.

The Tacan modulation signal consists of pulses with a DC component, a 15 cycle component and a 135 cycle component. At null all three components are removed. The 135 cycle component which is the most critical for accurate measurements is processed entirely digitally. Analog processing is used only for the other components.

Figure 9:
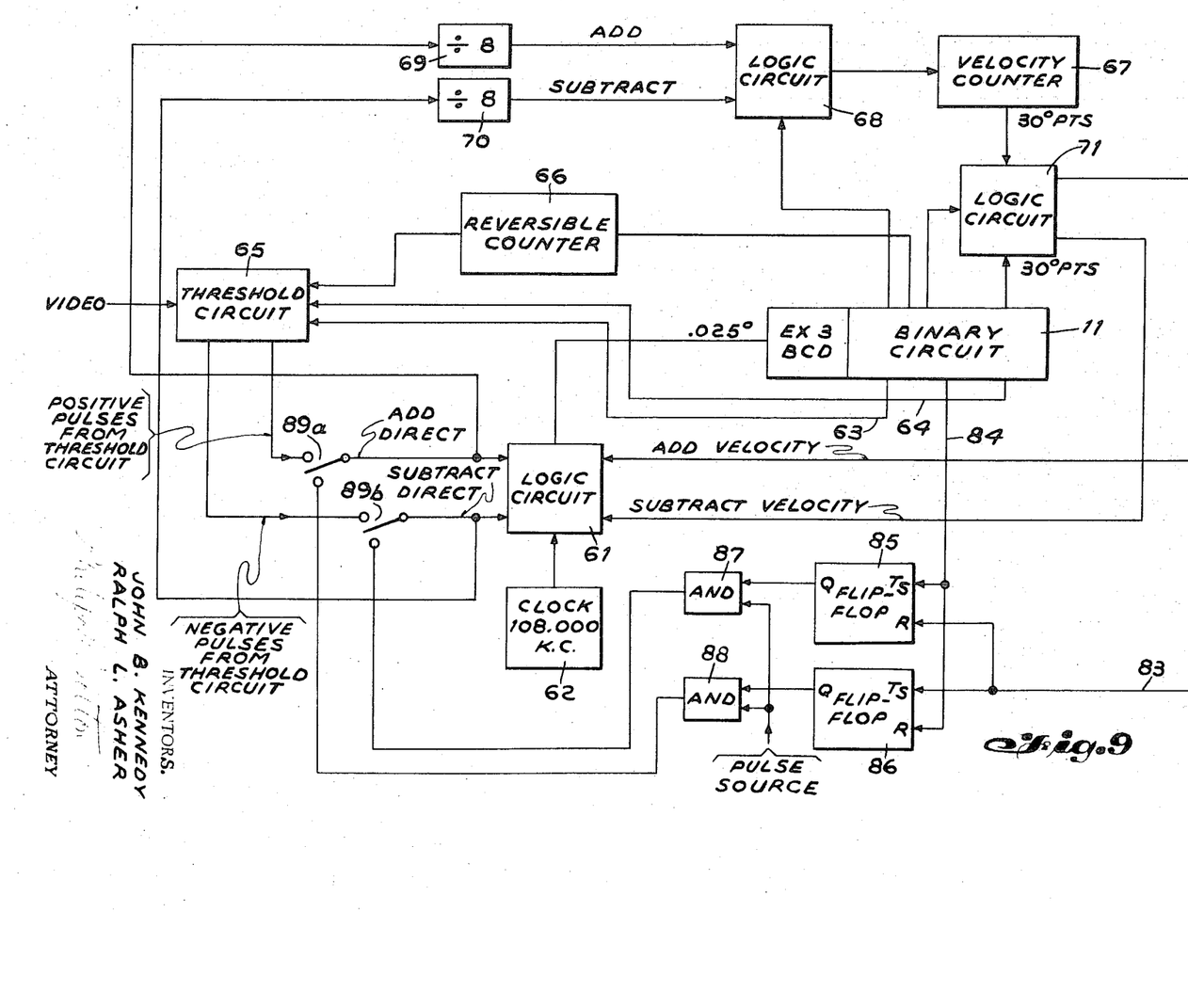
FIGURE 9 is a block diagram illustrating a circuit for phaselocking the modulation counter of FIG. 1.
Figure 10:
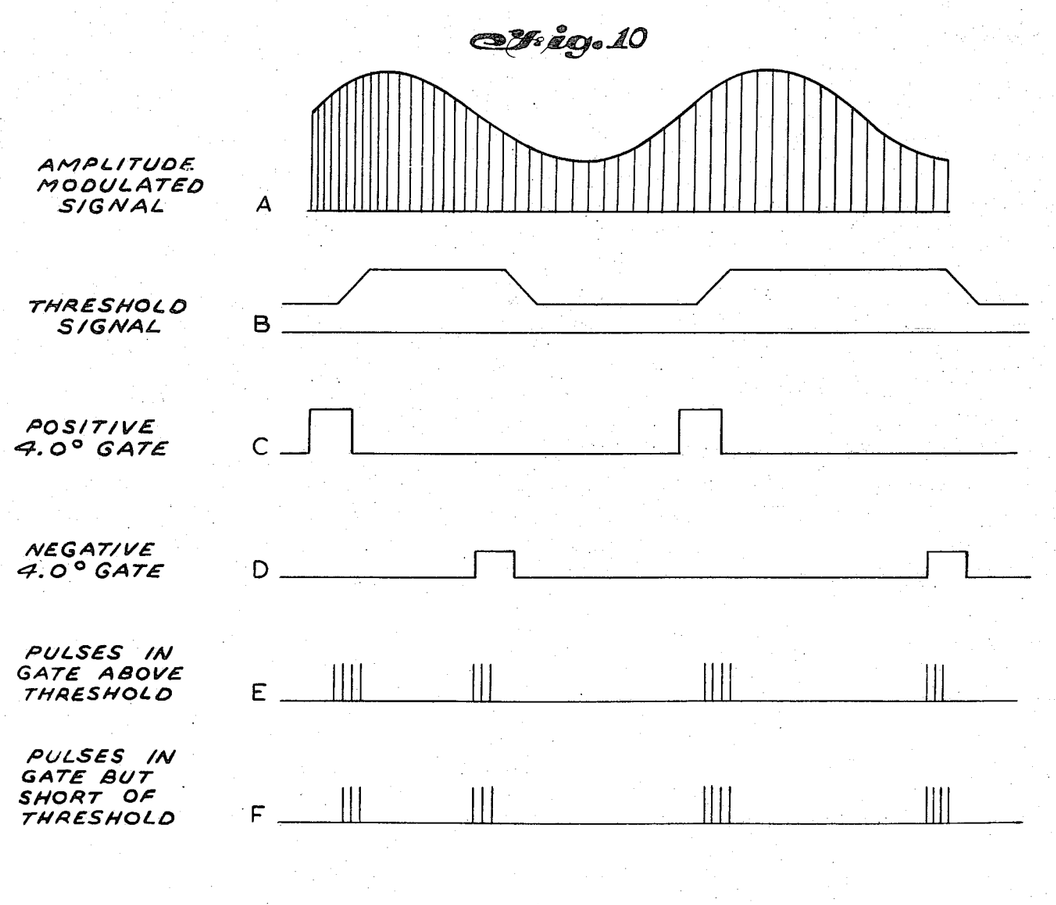
FIGURE 10 is a series of waveforms illustrating the method of detection of the modulation envelope.

FIGURE 9 is a block diagram illustrating the method of phase-locking a counter chain to the Tacan modulation envelope and is explained in conjunction with the waveforms of FIGURE 10. These diagrams show the operation with 135 c.p.s. signal only. Binary counter 11 with a least significant bit of 0.025° and a cycle length of 360° is fed a constant stream of clock pulses which have originated in a clock pulse generator 62 via a logic circuit 61. In the preferred embodiment clock pulse generator 62 is derived from the reference counter 10 which has been corrected for errors in the beacon speed, the clock being 14,400 times the beacon speed. Two gates 36 electrical degrees (4 space degrees) are formed every 40° on the counter cycle (135 c.p.s.). These gates are fed via lines 63 and 64 to a threshold circuit 65 (described hereinafter). These gates are illustrated in FIGURE 10 by waveforms C and D.

The amplitude modulated differentiated Tacan video signal is fed to threshold detector 65 where they are gated with the counter generated gates and their complement and cause triggering at the set threshold levels. The output of these gates shown in waveforms E and F in FIGURE 10 are used to advance or retard the phase of binary counter 11. The number of additive and subtractive pulses will not be equal unless the negative and positive four degree gates lie symmetrically about the modulation peaks.

The unequal additive or subtractive counts due to the gates not falling symmetrically about the modulation peaks are used to servo the counter phase until the gates do fall symmetrically. Pulses above threshold falling in the positive gate cause the counter to shift to the left. Pulses below threshold in the positive gate cause the counter to shift to the right. Pulses above threshold from the negative gate cause the counter to move to the right while pulses below the threshold in this gate cause the counter to move to the left. At null an equal number of pulses try to move the counter left and right, thus producing no net change.

In a second embodiment DC thresholding is employed within the narrow gates instead of a triangular waveform for trapezoidal thresholding. This second embodiment is subject to error if the video signal exhibits any non-random characteristic as was the case with earlier digital bearing measuring systems.

The positive and negative pulses from the threshold circuits cause an extra pulse to be added to, or one of the clock pulses to be deleted from binary counter 11. In addition counter 11 supplies the positive and negative four degree gates to the threshold circuit.

Figure 11:
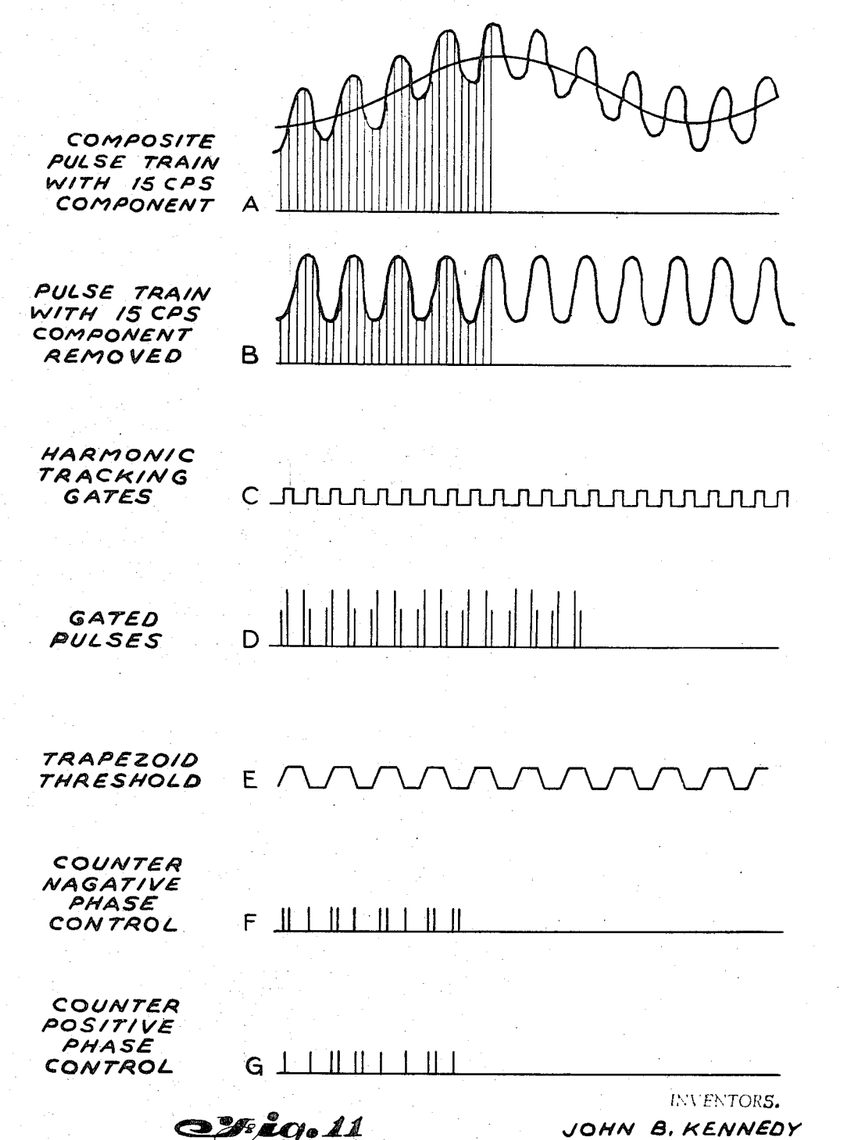
FIGURE 11 is a series of wave forms used in the phased-locked modulation system of FIGURE 9.

It can be seen from waveforms A and B in FIGURE 11 that if a 15 cycle bias in phase with the 15 cycle modulation component is subtracted from the composite that only the 135 cycle and DC components will remain.

The signal employed for threshold biasing and the narrow gates are obtained directly from the binary counter chain, the signal for threshold biasing via a reversible counter 66. The trapezoid amplitude is varied to maintain full sensitivity over varying depths of modulation.

A second counter 67 which also counts downward is provided to store velocity information. Counter 67 cycles at a 135 cycle rate and obtains its clock from a bit of binary counter 11 via logic circuit 68. The positive and negative pulses from the threshold circuit are divided down by divide 8 by circuits 69 and 70. A pulse from the add divider 69 sends an extra pulse to velocity counter 67, while a pulse out of the subtract divider 70 causes a pulse to be deleted from velocity counter 67 input. The phase of velocity counter 67 and the 135 cycle bit on binary counter 11 is compared at a logic circuit 71. If counter 11 reaches 30 degrees before velocity counter 67 completes its cycle, positive pulses are added to counter 11 by a method similar to that used for direct correct. If velocity counter 67 completes a cycle before the 30 degree point on counter 11, pulses will be obtained on subtract velocity line. These cause clock pulses to be deleted from counter 11.

By this method binary counter 11 is essentially phase-locked to the received modulation envelope.

Logic circuits 61, 68 and 71 are similar to those earlier detailed with respect to the section on phase-locking the reference counter and the design thereof with the earlier teaching would be obvious to those having ordinary skill in the art.

Referring to FIG. 12, the full Tacan composite signal is applied to an operational amplifier 72 via a differentiator 90. Also into amplifier 72, which is employed as a summer, there is applied a recovered 15 cycle sine wave and DC of negative polarity to permit subtraction, and a trapezoid which approximates the 135 cycle waveform in the four degree gates of interest. During modulation recovery the system described herein operates by employing the first pulses of the Tacan pulse pairs. This is done to minimize the effect of echoes of the first pulse on the second. In addition the leading edge of the first pulse is even freer from echoes so this is employed in the system. The received waveform is differentiated thus utililizing the 50 percent amplitude points of the wave. Since the first pulse is used for amplitude it is necessary to store it for 12 microseconds until the second pulse of the pair is received so that a decode can occur. This is done in a first hold circuit 73. The first pulse is applied through the summer 72 to the first hold circuit 73. The first hold 73 stores the pulse, and if a confirming pulse is received 12 microseconds later, information is transferred out of the first hold. If the second pulse is not received 12 microseconds later, the first pulse is cleared without the information being transferred on. There are 270 gates per second in which the first pulses of Tacan pairs are sampled. An average is made of these pulses in each gate in an averaging circuit 74. The output of this average is fed to unit 75 which consists of a pulse stretcher, a 15 cycle filter and a DC path. The pulse stretcher is much like a peak rider and will approximate in the open loop condition the 15 cycle waveform plus DC component. The 15 cycle filter extracts the 15 cycle component in the form of a pure sine wave and the DC amplitude. These two components are then fed back to the input of summer 72 in the closed loop condition. Thus, at the output of summer 72 with this loop closed will be a video signal with just the 135 cycle component on it. It is then necessary to null out the 135 cycle component on the input video and this is done during the four degree gates with the trapezoid waveform. The trapezoid waveform is produced by the digital circuits with reversible binary counter 66 after gating with the 4° gates, but this produces a constant amplitude trapezoid signal. It is desirable to vary the amplitude of this so that it coincides with the 135 cycle amplitude of the received signal. So, again the loop is closed through a gain controlled amplifier 76. The gain of this is controlled to the point in which there are no net pulses above threshold or below threshold in all of the gates when integrated over a period of time. To do this, the output of the first hold 73 is separated by comparing it with a DC reference into pulses above threshold and pulses below threshold. The pulses above threshold are integrated into a DC amplitude in circuit 77 and the pulses below threshold are integrated in a similar manner in integrator 78. The outputs of these two integrators are fed to a differential amplifier 79 and the output of differential amplifier 79 controls the AGC trapezoid amplifier 76. The pulses from first hold 73 which are separated into the pulses above threshold and pulses below threshold are then also applied to the digital circuits where phase-locking occurs. Pulses above threshold appear on line 80 and pulses below threshold on line 81.

Because of the nine times ambiguity of the 135 cycle wave, it is necessary to initially lock to approximately the correct bearing phase by means of the 15 cycle phase measurements. This is done by taking the 15 cycle sine wave recovered in the threshold circuits and producing from it by means of an operational amplifier level detector 82 a square wave. This square wave appearing on line 83 (FIG. 12) is locked to the 15 cycle component of the incoming signal. From the binary counter 11 by proper gating a 15 cycle square wave is selected on line 84 (FIG. 9) whose phase is locked to the binary counter. The phase of these two square waves are then compared in a simple phase comparator circuit comprising two flip flops 85 and 86 and AND gates 87 and 88. The 15 cycle received square wave can trigger one flip flop while the 15 cycle counter square wave can reset it producing an error gate when the received square wave is leading the counter square wave. An opposite arrangement will produce an error gate when the phase is of the opposite sense. During these error gates, pulses, which in the preferred embodiment are derived from a bit on the reference counter 10, are gated by the error gate and they are put onto the add direct or subtract direct lines by means of a switch schematically shown as 89a and 89b into logic 61. When null is approximately reached and after a suitable time period, sequencing circuits switch to the 135 cycle operation described above.

While we have described above the principles of our invention in connection with specific apparatus, it is to be clearly understood that this description is made only by way of example and not as a limitation on the scope of our invention as set forth in the accompanying claims.

We claim:

1. In a bearing measuring system, a receiver adapted to detect bearing information from a beacon emitting a complex rotating signal including a fundamental wave, a harmonic wave, and spaced main and auxiliary reference signals having predetermined repetition frequencies equal to the frequencies of said fundamental and harmonic waves respectively, comprising:
   a first counter;
   means for phase-locking said first counter to said reference signals;
   a second counter;
   means for deriving from said first counter a clock signal;
   means for applying said clock signal to said second counter for causing said second counter to count;
   means for comparing in time, selected bits of said first and second counters to derive the velocity error;
   means for advancing or retarding said first counter in proportion to said velocity error;
   a third counter;
   means for phase-locking said third counter to said fundamental and harmonic waves; and
   means responsive to the quantities held in said first and third counters for yielding measurement of bearing.

2. A receiver as in claim 1 wherein said means for phase-locking said first counter to said reference signals includes:
  means for setting said first counter to zero at the arrival of a main reference signal;
  a clock generator coupled to said first counter for driving said counter;
  means for generating a pair of gates at the anticipated arrival time of said reference signals;
  means for applying said reference signals within said gates for determining if said reference signals fall within said gates symmetrically; and
  means for adding a count to or deleting a count from said clock generator driving said first counter in accordance with any asymmetrical centering of said reference signals within said gates.

3. A receiver as in claim 1 wherein said means for phase-locking said third counter to said fundamental and harmonic waves includes a clock for driving said third counter, said clock being derived from a selected bit of said first counter.

4. A receiver as in claim 1, further including:
  a fourth counter coupled to said third counter for storing velocity information.

5. A receiver as in claim 4 wherein said fourth counter derives its clock from a bit on said third counter, further including means for comparing selected bits of said third and fourth counters, and means responsive to said comparison for adjusting said third counter.

6. In a bearing measuring system, a receiver adapted to detect bearing information from a beacon emitting a complex rotating signal including a fundamental wave, a harmonic wave, and spaced main and auxiliary reference signals having predetermined repetition frequencies equal to the frequencies of said fundamental and harmonic waves respectively, comprising:
  a first counter;
  means for phase-locking said first conuter to said reference signals;
  a second counter;
  means for phase-locking said second counter to said fundamental and harmonic waves, including a threshold detector, means to apply the received fundamental and harmonic waves to said threshold detector, means to cycle said second counter at a predetermined rate, means to generate gates on said counter cycle, the widths thereof being less than one half the period of said harmonic waves, means to gate the output of said threshold detector with said generated gates, and means to advance or retard said second counter in response to any asymmetrical centering of the threshold detector output in said generated gates.

7. A receiver as in claim 6 in which said gates are less than ten space degrees wide at the frequency of said harmonic wave.

8. A receiver as in claim 6 in which two gates are generated on each cycle of said harmonic wave.

9. A receiver as in claim 8 in which the gated output of said threshold detector with said generated gates has a trapezoidal configuration approximating the harmonic signal wave shape.

10. A receiver as in claim 9 in which pulses above threshold falling in the first of said two gates and pulses below threshold falling in the second of said two gates cause said second counter to shift in a first direction and in which pulses above threshold falling in said second of said two gates and pulses below threshold falling said first of said two gates causes said second counter to shift in the opposite direction until said gates fall symmetrically about the modulation peak of said harmonic wave.

11. A receiver as in claim 10 in which the trapezoidal amplitude is adjusted to coincide with the amplitude of said harmonic wave.

References Cited
UNITED STATES PATENTS

| | | | |
|---|---|---|---|
| 2,924,822 | 2/1960 | De Faymorean et al. | 343—106 |
| 3,218,553 | 11/1965 | Peterson et al. | 324—68 |
| 3,218,560 | 11/1965 | Peters | 324—68 |
| 3,267,473 | 11/1966 | Galloway | 343—106 |

RODNEY D. BENNETT, *Primary Examiner.*

H. C. WAMSLEY, *Assistant Examiner.*